Figure 1:
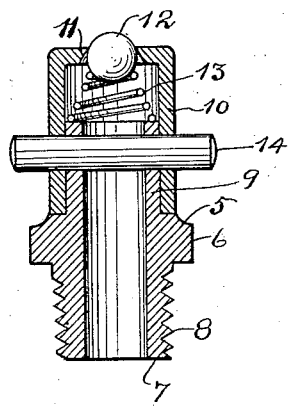

Sept. 28, 1926.

L. E. FOGEL

OIL AND GREASE CUP

Filed Jan. 27, 1925

1,601,495

INVENTOR
Louis E. Fogel
BY
Attorney

Patented Sept. 28, 1926.

1,601,495

UNITED STATES PATENT OFFICE.

LOUIS E. FOGEL, OF BROOKLYN, NEW YORK.

OIL AND GREASE CUP.

Application filed January 27, 1925. Serial No. 4,994.

The device, the subject of this invention is an oil or grease cup, intended to be inserted into an oil hole, to retain the hole closed, except at the time when oil or grease is being inserted into the bearing.

A special object of the invention is to provide an extremely resilient spring and one that will allow the introduction of oil or grease at slightly greater than normal or atmospheric pressure.

Another object of the invention is to so simplify the construction that the device may be repaired or a new spring inserted without the removal of the device or in a very simple manner, that may be understood by even the most unmechanical.

With these objects in view, the following is what I consider the best means of carrying out my invention and the accompanying drawing should be referred to for a complete understanding of the specification which follows.

In the drawing:—

Fig. 1, is a central, sectional view of my device, and

Figure 2:
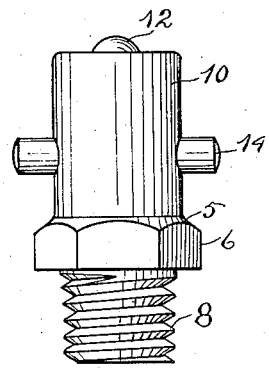

Fig. 2, a side elevation of the device.

Similar reference numerals indicate like parts in all of the figures where they appear.

My device consists of a body member 5, having a hexagonal and projecting portion 6, adapted to receive a wrench and to serve as a flange over the hole or recess into which the device is introduced.

It will be understood that my device is entered into a screw threaded hole or aperture and I provide a projection 7 having screw threads 8, which is adapted to be introduced and secured in the screw threaded aperture. The projection 7 may be considered as under the flange and hexagonal portion 6.

Above the projecting portion 6, I provide a second projection as shown at 9, formed integral with the body portion 5. Upon the projection 9 I arrange a cap or shell 10 which may be formed as a thimble having a central and tapered portion 11, into which I place a ball 12, which serves as a valve for closing the perforation 11. Between the ball 12 and the upper end of the projection 9, I place a coiled spring 13, this spring being formed with coils of increasing diameter, so that when closed, the smaller coils will fit within the larger coils and the spring will have a maximum movement.

I provide a perforation through the projection 9 and shell 10 and through this perforation I pass a pin 14, the pin serving to retain the shell in position and also serving as a means for securing an ordinary grease or oil gun or pressure system.

It will be noted that the cap 10 should fit closely upon the projection 9; that the size or shape of my device may be varied to meet special requirements and that other modifications may be made within the scope of the appended claims, without departing from the principle or sacrificing the advantages of the invention.

Having carefully and fully described my invention, what I claim and desire to obtain is:—

1. An oil or grease cup comprising a body member, a perforated cap therefor, a spring urged valve within said cap and operable in the perforation thereof and a pin passing through said body member and said cap, for retaining said valve within said cap and said cap in operative position, the ends of said pin projecting beyond said cap for the reception of a grease or oil applying means.

2. An oil or grease cup having a body member provided with a plurality of projections, one of which is screw threaded, a cap closely engaged upon the other said projection, a spring within said cap and resting upon the upper end of said second projection, a valve operated by said spring and a pin passing transversely through said cap and the projection upon which it is engaged, for securing said cap in position, said pin extending beyond said cap and at each side thereof, for the reception of a grease or oil applying means.

Signed at the city, county and State of New York, this 14 day of January, 1925.

LOUIS E. FOGEL.